John B. Morse, & Loren L. Carter,
Harvester-Rake.
N°. 87,699. Patented Mar. 9, 1869.
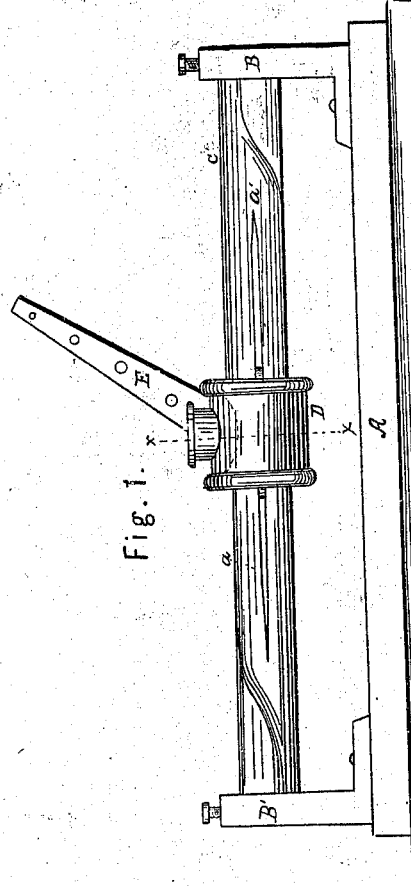
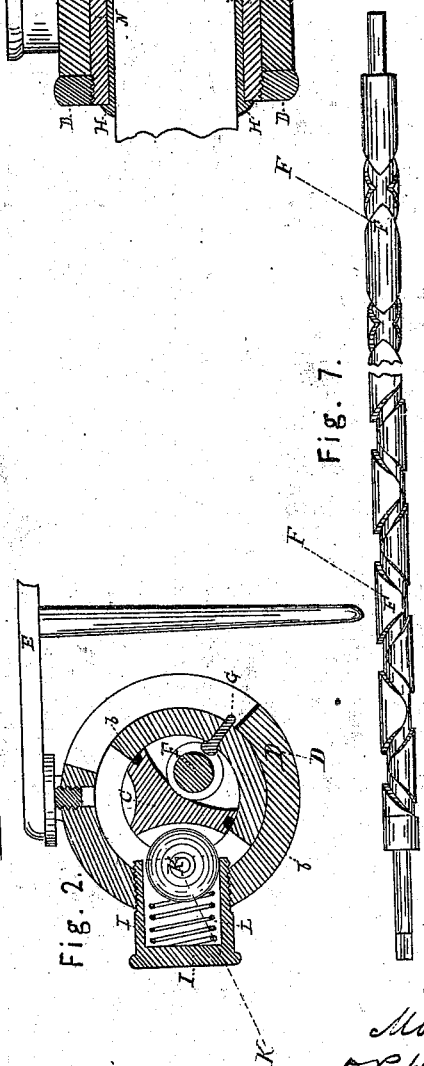
Witnesses
Jos. R. Edson
C. F. Clausen
Inventors
Morse & Carter
D. P. Holloway & Co
Attys

UNITED STATES PATENT OFFICE.

JOHN B. MORSE AND LOREN L. CARTER, OF LA FAYETTE, INDIANA.

IMPROVEMENT IN HARVESTER-RAKES.

Specification forming part of Letters Patent No. 87,699, dated March 9, 1869.

*To all whom it may concern:*

Be it known that we, JOHN B. MORSE and LOREN L. CARTER, of La Fayette, in the county of Tippecanoe and State of Indiana, have invented a new and useful Improvement in Grain-Harvesters; and we do hereby declare that the following is a full, clear, and exact description of the same, reference being had to the annexed drawings, making part of this specification, in which—

Figure 1 is a side elevation of our improved rake for harvesters. Fig. 2 is a sectional elevation on line $x\,x$ of Fig. 1. Fig. 3 is an end view of the slide or rake-carrier with the rake attached. Fig. 4 is an elevation of the guide which is secured to the rake-carrier, and which works in the endless screw F, for the purpose of controlling the movement of said carrier. Fig. 5 is an end view of the standard B, showing also an end view of the screw and of the guide of the rake. Fig. 6 is a side elevation of the gib which retains the slide or rake-carrier in position, Fig. 7 being a side view of the endless screw, which gives the reciprocating motion to the rake-carrier; and Fig. 8 is a longitudinal section of the rake-carrier, showing the sleeve to which its flanges are secured, and the keys or gibs which retain such sleeve in its position upon the shaft C.

Corresponding letters in all the figures refer to corresponding parts.

This invention relates to an improvement in that class of machines known as "harvesters;" and it consists in an improved device for moving the rake across the platform of such machine.

The invention further consists in the combination and arrangement of the parts of which the device is composed, as will be more fully explained hereafter.

A in the drawings represents the platform of a harvesting-machine, upon which the grain falls after having been cut, which may be of any suitable construction adapted to receive our improved rake.

B B' represent standards of metal, which are to be secured to the platform of the machine, and in such positions as to receive the ends of the screw which moves the rake and of the grooved guide which otherwise controls its movements.

C represents a shaft or mandrel, the outer ends of which have their bearings in the standards B B', where they are held by set-screws. This shaft has formed in its surface two semicircular grooves, $a\;a'$, which may extend throughout its entire length, each of which grooves terminates in the adjoining one by means of a curve or bend formed in each near the ends thereof, the curvature of which is such as to form an easy ascent and descent of the ball or spoke K as it arrives at those points in traversing the length of said shaft. The office of these grooves is to determine the position of the rake in its movements as it moves across the platform, the one designated by little $a'$ being the one which causes the fingers of the rake to move in contact with the platform, for the purpose of removing the grain which may have been deposited thereon during the return movement of said rake, while the one marked $a$ is for the purpose of guiding the rake in its return movement, after it has been elevated to a vertical or nearly vertical position by means of the ball K, which, at the proper time, comes in contact with the incline formed by the curve in said groove, and thus effects the desired change of position. So soon as this change has been effected the rake, with its carrier, starts upon its return movement, it being controlled in its longitudinal movements by the screw F, the ball K traversing the groove $a$, which, it will be seen, causes the rake to assume the vertical position above referred to, and to remain in that position until it arrives at the incline in the opposite end of the shaft, by which it will be returned to its position upon the platform. This shaft is also provided with slots or key-rings $b$, formed in those portions of its periphery which are between the grooves $a\;a'$ and the recess in which the screw F revolves, said slots being for the reception of the keys or gibs H, which prevent the carrier from revolving upon said shaft.

D represents the rake-carrier, which is composed of a cast-metal ring or band, which incloses the sleeve N, and which is secured thereto by means of flanges, which are screwed upon the ends of said sleeve and against the ends of the ring. This ring has an aperture formed in it for the reception of cup I, which cup contains the spring L and ball K, said ball, as above described, controlling the elevating and depressing movements of the rake by pressing through the grooves of shaft C. This ring, it will be seen upon reference to Fig. 2, is provided with a slot or groove which extends through a portion of its surface, and which serves to prevent the same from rotating too far when it is moved by the inclines in shaft C, which office is performed by means of a pin or shank formed upon and constituting a portion of the section of thread or nut G, which pin passes through the sleeve N and comes in contact with the shoulders in ring D, formed by the termination of the above-described slot.

E represents the rake, which may consist of an arm of wood or metal, which is firmly secured to a boss or projection raised upon the ring D, and which, when the rake is in position for clearing the platform of grain, extends in a horizontal direction over such platform, or outward to its outer edge. This arm is to be provided with a suitable number of teeth, which are to be of the proper length to extend from such arm when the same is in its horizontal position to the upper surface of the platform, so that, as it passes over such platform it will remove any grain that may be lying thereon and deposit it at the end thereof in a bundle, ready for binding.

F represents an endless screw of coarse pitch, which is to be made by cutting two threads upon its surface, one a right-handed one and the other a left-handed one, and causing both of these threads to terminate in a common groove at each of their ends, so that, by revolving the screw always in one direction, which may be done by any suitable attachment secured to the end thereof, the rake, with its carrier, will be moved in opposite directions, which change of motion will take place at the time when the inclines in the shaft have operated to partially rotate the carrier, and thus to elevate or depress the rake, as above described. The position of this double screw in the device is to be within a groove or recess formed in the shaft C, as clearly shown in Fig. 3 of the drawings, both of which are embraced by the sleeve N and ring D, as shown in Figs. 2 and 8.

G represents the section of a thread or nut above referred to, which is secured within ring D and sleeve N, its curved portion working in the threads of the screw, for the purpose of giving motion to the rake-carrier.

H represents a gib, which works in slots or splines formed in the periphery of shaft C, as shown at $b\ b$, which is for the purpose of keeping the sleeve N in its position and preventing the same from rotating upon said shaft.

Having thus described our invention, what we claim, and desire to secure by Letters Patent, is—

1. The grooved shaft C, constructed substantially as shown and described.

2. The rake-carrier consisting of the sleeve N, ring D, with its clamping-flanges, cup I, spring L, and ball or sphere K, all constructed and combined substantially as shown and described.

3. The combination and arrangement of the screw F and groove-shaft C, substantially as shown and described.

4. The combination of the screw F, grooved shaft C, and rake-carrier, substantially as shown and described.

5. The combination of the rake-carrier and the rake E, substantially as shown.

In testimony whereof we have signed our names to this specification in the presence of two subscribing witnesses.

JOHN B. MORSE.
LOREN L. CARTER.

Witnesses:
J. HERMAN WIEBER,
NATHAN P. MOUNT.